(12) United States Patent
Zeng et al.

(10) Patent No.: US 10,701,102 B2
(45) Date of Patent: Jun. 30, 2020

(54) HARDWARE MODULE-BASED AUTHENTICATION IN INTRA-VEHICLE NETWORKS

(71) Applicant: George Mason University, Fairfax, VA (US)

(72) Inventors: Kai Zeng, Fairfax, VA (US); Eric Wang, Alexandria, VA (US); William Xu, Alexandria, VA (US); Suhas Sastry, Alexandria, VA (US)

(73) Assignee: George Mason University, Fairfax, VA (US)

( * ) Notice: Subject to any disclaimer, the term of this patent is extended or adjusted under 35 U.S.C. 154(b) by 0 days.

(21) Appl. No.: 16/149,715

(22) Filed: Oct. 2, 2018

(65) Prior Publication Data
US 2019/0104149 A1 Apr. 4, 2019

Related U.S. Application Data

(60) Provisional application No. 62/567,351, filed on Oct. 3, 2017.

(51) Int. Cl.
*H04L 29/06* (2006.01)
*H04L 9/08* (2006.01)
(Continued)

(52) U.S. Cl.
CPC ........ *H04L 63/1441* (2013.01); *H04L 9/0643* (2013.01); *H04L 9/0861* (2013.01);
(Continued)

(58) Field of Classification Search
CPC . H04L 63/1441; H04L 9/0643; H04L 9/0861; H04L 9/12; H04L 9/3242;
(Continued)

(56) References Cited

U.S. PATENT DOCUMENTS 9,077,521 B2 * 7/2015 Machani ............. H04L 63/0435
9,231,936 B1 * 1/2016 Wang ...................... H04L 63/08
(Continued)

*Primary Examiner* — Ghodrat Jamshidi
(74) *Attorney, Agent, or Firm* — W&C, IP

(57) ABSTRACT

A secure hardware-based module or Security Electronic Control Unit (SECU) for a Controller Area Network (CAN) prevents an attacker from sending malicious messages through the CAN bus to take over control of a vehicle. The SECU shares a unique key and counter with each ECU on the CAN bus. When a legitimate ECU sends a message, it first compresses the message and then generates a MAC of the counter and a secret key. The counter is increased by one for each transmitted message. The ECU then fits the compressed message and the MAC into one CAN frame and sends it onto the CAN bus. The SECU performs the message verification on behalf of the intended receiver(s) of the message. If the verification passes, the receiver(s) simply decompress the message and use it as a normal CAN message. If the verification fails, the SECU will corrupt the CAN frame before it is fully received by the intended receiver(s). The corrupted CAN frame will be ignored by the intended receiver(s) as if it was never received. Therefore, a malicious message generated by an attacker will inflict no damage on the system.

4 Claims, 14 Drawing Sheets

(51) Int. Cl.

| | | |
|---|---|---|
| *H04L 12/40* | (2006.01) | |
| *H04L 29/08* | (2006.01) | |
| *H04L 12/46* | (2006.01) | |
| *H04L 9/32* | (2006.01) | |
| *H04L 9/06* | (2006.01) | |
| *H04L 9/12* | (2006.01) | |
| *H04W 4/48* | (2018.01) | |

(52) U.S. Cl.
CPC .............. *H04L 9/12* (2013.01); *H04L 9/3242* (2013.01); *H04L 12/40026* (2013.01); *H04L 12/4625* (2013.01); *H04L 63/062* (2013.01); *H04L 63/0853* (2013.01); *H04L 63/0876* (2013.01); *H04L 63/123* (2013.01); *H04L 67/125* (2013.01); *H04L 63/1458* (2013.01); *H04L 63/1466* (2013.01); *H04L 67/12* (2013.01); *H04L 2012/40215* (2013.01); *H04L 2209/34* (2013.01); *H04W 4/48* (2018.02)

(58) Field of Classification Search
CPC ........... H04L 12/40026; H04L 12/4625; H04L 63/062; H04L 63/0876; H04L 63/123; H04L 67/125; H04L 2012/40215; H04L 2209/34

See application file for complete search history.

(56) References Cited

U.S. PATENT DOCUMENTS

| | | | | |
|---|---|---|---|---|
| 9,725,073 | B2* | 8/2017 | Haga | B60R 25/307 |
| 2013/0111582 | A1* | 5/2013 | Forest | G06F 21/44 |
| | | | | 726/19 |
| 2014/0310530 | A1* | 10/2014 | Oguma | H04L 9/3242 |
| | | | | 713/181 |
| 2015/0270968 | A1* | 9/2015 | Nairn | H04L 9/32 |
| | | | | 713/181 |
| 2016/0297401 | A1* | 10/2016 | Haga | H04L 9/3242 |
| 2016/0315766 | A1* | 10/2016 | Ujiie | H04L 63/0428 |
| 2017/0013006 | A1* | 1/2017 | Ujiie | H04L 63/08 |
| 2017/0111177 | A1* | 4/2017 | Oguma | H04L 67/12 |
| 2017/0300444 | A1* | 10/2017 | Maletsky | G06F 13/4027 |
| 2018/0006829 | A1* | 1/2018 | Kravitz | H04L 9/3255 |
| 2018/0131522 | A1* | 5/2018 | Lawlis | H04L 9/3242 |
| 2019/0028448 | A1* | 1/2019 | Farrell | H04L 9/3271 |

* cited by examiner

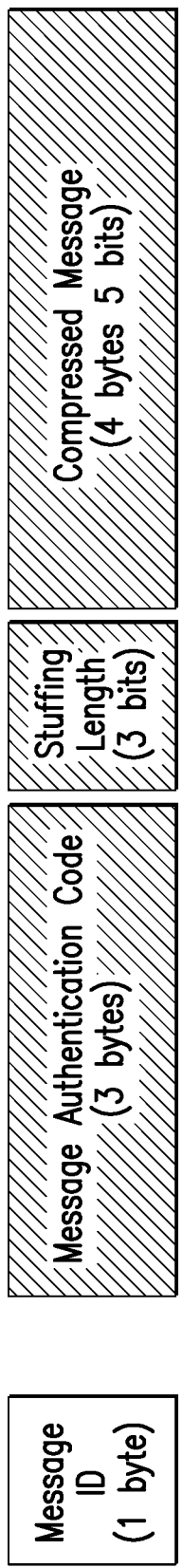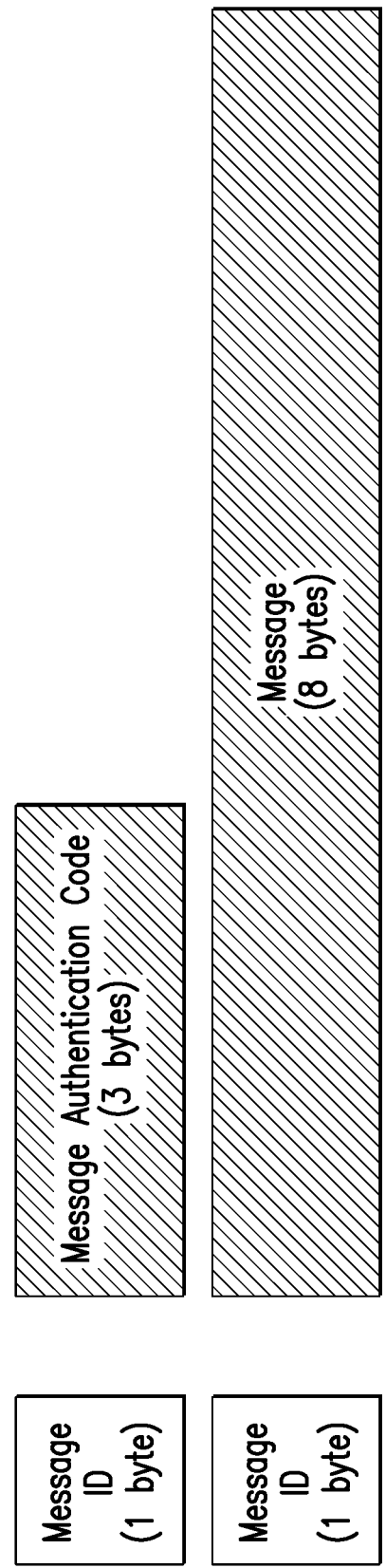
FIG.5

HARDWARE MODULE-BASED AUTHENTICATION IN INTRA-VEHICLE NETWORKS

BACKGROUND OF THE INVENTION

Field of the Invention

The present invention generally relates to security systems for Electronic Control Units (ECUs) particularly for use in Controller Area Networks (CANs) as used in vehicle communication systems and, more specifically, the invention is directed to a secure hardware-based module or Security ECU (SECU) for a Controller Area Network (CAN) to prevent an attacker from sending malicious messages through the CAN bus to take over a vehicle.

Background Description

The Controller Area Network (CAN) was invented by Bosch GmbH in order to provide reliable, fast communication between ECUs in automotive networks. However, it was not designed for security, and as such remains vulnerable to various attacks from both physical and wireless interfaces. Although the majority of cars are vulnerable to attacks through physical media, such as the On-Board Diagnostics (OBD-II) port, recent developments in automotive technology have made cars increasingly connected with each other, mobile devices, and infrastructure via wireless interfaces. This connected car technology enables functions such as cooperative adaptive cruise control, telematics, and traffic management. However, at the same time, it opens new attack vectors for the CAN, through wireless interfaces or OBD-II access. For instance, attackers can exploit the cellular data link connecting to the telematics ECU to send malicious messages into the CAN bus, to take control of other ECUs and the vehicle as a whole. These types of vulnerabilities pose great risks to drivers and passengers, as even small disruptions of car control can cause lethal results.

One way to improve the security of CAN bus intra-vehicle networks is to add message authentication. However, implementing authentication protocols in automotive networks also introduces delay (overhead). Critical messages must be transferred and processed as fast as possible, and extra overhead could prove fatal in certain circumstances. Therefore, any practical authentication system must keep overhead and delay at a minimum. Furthermore, there are already millions of cars in use, so it would be unrealistic to recall cars and change their ECUs to add authentication mechanisms or modify the CAN protocol itself. A desirable solution should be backwards-compatible with existing CAN systems, with minimal changes to ECU software and the CAN protocol.

Although instances of cyber attacks on vehicles are fairly recent, there are already some proposed models or mechanisms for authentication and security in automotive networks. To date, however, we are not aware of an approach that successfully provides low latency, reliability, cost efficiency, and security.

One notable exploration of authentication in intra-vehicle networks is the CANAuth protocol. CANAuth is built upon the CAN+ protocol, which allows for transmission of up to sixteen bytes of additional data per byte of CAN data. However, to use CAN+, one must install special CAN+ transceivers on every ECU in one's car, severely diminishing CANAuth's ease of implementation. This renders CAN-Auth impractical for cars already on the road, since doing so would require accessing numerous ECUs embedded in the critical systems of the car.

Another system, proposed by Mundhenk et al. (Lightweight authentication for secure automotive networks, *Proceedings of the* 2015 *Design, Automation & Test in Europe Conference & Exhibition* (2015), EDA Consortium, pp. 2017-288), focuses on adapting traditional encryption standards to automotive networks. This system encounters the same issue as CANAuth: It requires the installation of hardware modules on each ECU, making implementation more difficult.

There are several software-based solutions proposed for intra-vehicle network security. The most notable of these is VeCure, which utilizes precomputation of MACs (Message Authentication Codes) to achieve delays of as low as 50 microseconds. Despite this, VeCure relies on sending two messages in immediate succession, but sequential receipt is not guaranteed due to the possibility of a higher-priority message arriving between the two messages. Furthermore, VeCure's delay, though small, is still far greater than that of an unmodified CAN bus. Other software-based solutions include those of Schweppe et al. (Car2x Communication: Securing the Last Meter—A cost-effective approach for ensuring trust in Car2x applications using in-vehicle symmetric cryptography, 2011 *IEEE Vehicular Technology Conference (VTC Fall)*(2011), IEEE pp. 1-5) and Glas et al. (Signal-based automotive communication security and its interplay with safety requirements, *Proceedings of Embedded Security in Cars Conference* (2012)). Schweppe et al. have focused on creating secure key-distribution and secure communication channel protocols. Glas et al. have explored different placements for MACs. Both of these software-based solutions introduce substantial latency.

A promising approach to resolving the issue of processing power is to add a more powerful node to the in-car network that would perform security functions. Seifert and Obermaisser propose that such a "security gateway" be deployed in the intersection of all the different buses in the in-car network (Secure Automotive Gateway: Secure communication for future cars, 2014 12th IEEE International Conference on Industrial Informatics (INDIN) (2014) pp.213-220). This hardware node would introduce a single point of failure—if it failed, then the entire in-car network would fail. Also, the use of this security gateway does not prevent individual networks from being compromised, as it only filters traffic between the different types of networks. Authentication between a user device and an in-vehicle gateway node has been studied; however, the case in which the ECUs are compromised has not considered.

It is assumed that the attacker's goal is to send malicious messages into the CAN bus to gain control of the car or interfere with normal operation of the car. Two types of attackers are considered: the outside attacker and the inside attacker.

The outside attacker can be a malicious device which is attached to the CAN bus. It can be a malicious ECU attached to the CAN bus or a compromised OBD-II dongle. We assume there are no shared secrets between the outside attacker and any ECUs on the CAN bus.

The inside attacker can be a compromised ECU, which has a shared secret key with the SECU, but not with any other ECUs. The inside attacker can generate legitimate messages. It is assumed that both outside and inside attackers can replay messages transmitted by other ECUs or inject arbitrary messages into the CAN bus. They can launch the following attacks.

1. Collision attacks, in which they generate a large amount of message and MAC pairs in order to have some messages pass the authentication.
2. Bit injection attacks, in which the attacker overwrite recessive bits (low voltage) with dominant bits (high voltage) to modify the contents of a message. Bit injection is limited to overwriting recessive bits.
3. In-protocol denial-of-service (DoS) attacks, in which the attacker attempts to send messages at a high data rate in order to prevent other legitimate communications. We call it "in-protocol", since we assume the attackers still follow the CAN medium access control, CSMA/CA (Carrier Sense Multiple Access/Collision Avoidance).

Jamming attacks are not considered, where attackers send noise signals into the CAN bus to disrupt all communications. This kind of attacker does not comply with CSMA/CA and can send the noise signals at any time no matter there is any communication in the network or not. In this case, a CAN bus jamming detection and isolation mechanism has to be implemented or the car has to be pulled over for safety.

To conduct the first attack, an attacker needs physical access to the intra-vehicle network to attach a new ECU onto the CAN bus or compromises an OBD-II dongle. Note that the OBD-II dongle is widely used for vehicle diagnostic or driver monitoring. We assume there is no shared secret between the malicious device (attached ECU or compromised OBD-II dongle) and any ECUs on the CAN bus. Direct injection into the CAN bus is not possible without physical access to the CAN bus or the OBD-II port, which is located inside the vehicle.

SUMMARY OF THE INVENTION

To address the above challenges, the present invention provides a real-time authentication mechanism for securing in-car CAN bus communications. The major features of the invention are summarized as follows.

The addition of a secure hardware module (the SECU) onto the CAN bus. The hardware module can perform key distribution and message verification, and can destroy malicious messages before they are fully received by ECUs. The module significantly enhances the security of in-car network communications and reduces the overhead of key management. With the SECU, only software updates are required for existing ECUs. They only need to compute MACs, and they do not need to conduct verification. Therefore, delay and computation overhead on message verification are also reduced compared with traditional message authentication protocols.

6.673 million CAN messages are collected from various cars and entropy and pattern analysis were conducted of the messages. The CAN messages collectively have low entropy, with an average of 11.436 bits. This finding supports CAN message compression, which allows the message size to be significantly reduced to fit the message and its MAC within a single CAN frame, thus enabling fast authentication.

In order to find an optimal compression method, various coding schemes were tested and it was found that Huffman coding with interframe compression meets message space and storage space requirements.

A new ECU synchronization process was developed to allow more efficient transfer of compression trees.

The authentication mechanism was implemented on a test bed using industry standard MCP2551 CAN transceivers and Raspberry Pi embedded systems.

Experimental evaluation was conducted using the test bed. Evaluation results show that the invention can achieve real-time message authentication on the CAN bus with minimal latency.

According to the invention, the SECU, which is added to the CAN bus, performs key distribution and message verification as well as corrupting malicious messages before they are fully received by ECUs connected to the CAN bus. Only software modification is needed for existing ECUs without changing the CAN protocol.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is a diagram illustrating different types of CAN data messages of modified protocol;

DETAILED DESCRIPTION THE INVENTION

Figure 1:
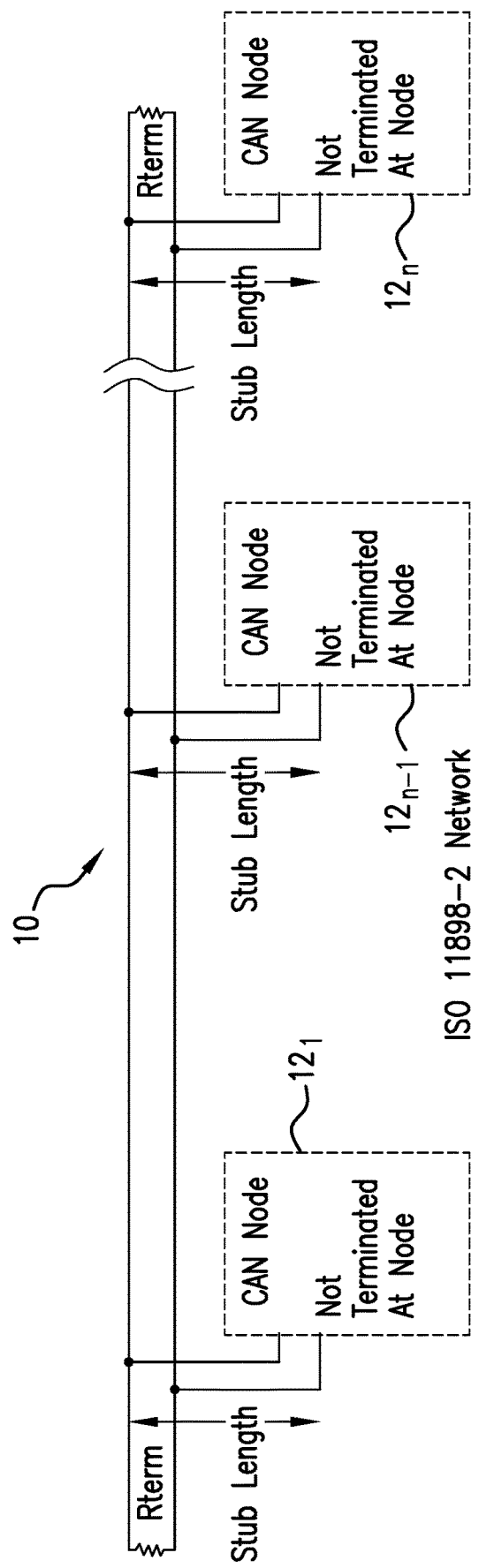
FIG. 1 is a schematic diagram showing a simplified architecture of a high-speed CAN network.

CAN is a multi-master serial bus standard for connecting ECUs, also known as nodes. All nodes are connected to each other through a two wire bus. ISO-11898-2, also called high speed CAN, is the standard implemented in modern automobiles. Modern automobiles may have as many as 70 ECUs for various subsystems, such as the engine control unit, transmission, airbags, antilock braking system (ABS), cruise control, power steering, audio systems, and so forth. FIG. 1 illustrates the architecture of the high speed CAN which comprises a two wire bus, or CAN bus, 10 terminated at each end by 120Ω resistors. A plurality of ECUs, or nodes, $12_1$ to $12_n$ are connected to the CAN bus 10. The bus standard allows the ECUS to communicate with each other without a host computer. The comminations are a message-based protocol rather than an address based protocol.

Figure 2:
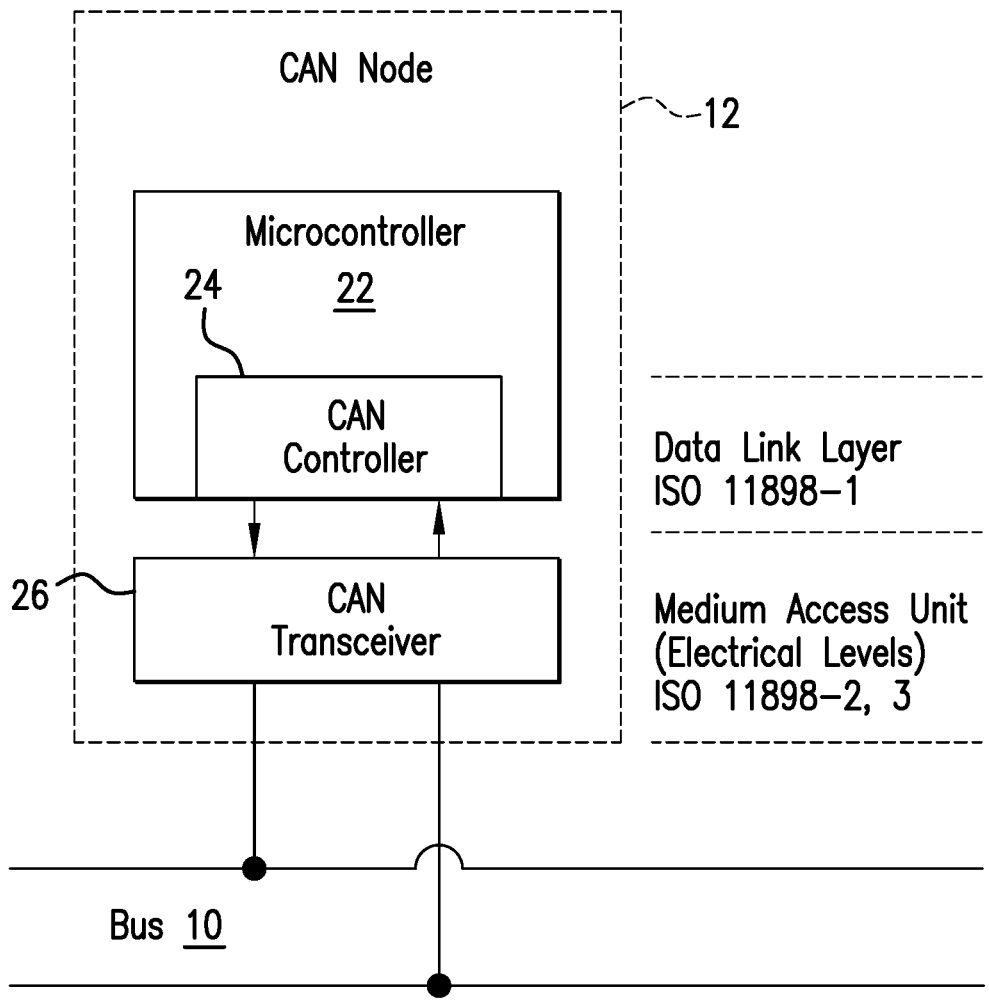
FIG. 2 is a block and schematic diagram showing the basic architecture of a CAN ECU.

FIG. 2 illustrates a CAN node or ECU. Generally, each ECU 20 comprises a central processor 22, typically a microcontroller, a CAN controller 24, and a transceiver 26. The microcontroller 22 decides what the messages received on the CAN bus 10 mean and what messages it wants to transmit on the CAN bus 10. Sensors, actuators and control devices can be connected to the microcontroller 22 of each ECU. The CAN controller 24, often an integral part of the microcontroller 22, performs the functions of receiving and sending messages. The CAN controller 24 stores received serial bits from the CAN bus 10 until an entire message is available, which can then be fetched by the microcontroller 22. The microcontroller 22 sends a transmit message to the CAN controller 24, which transmits the bits serially onto the CAN bus 10 when the bus is free. The transceiver 26 converts a received data stream from the CAN bus levels to levels that the CAN controller 24 uses. Conversely, the transceiver 26 converts the data stream from the CAN controller 24 to CAN bus levels. Each ECU is able to send and receive messages on the CAN bus, but not simultaneously.

Figure 3:
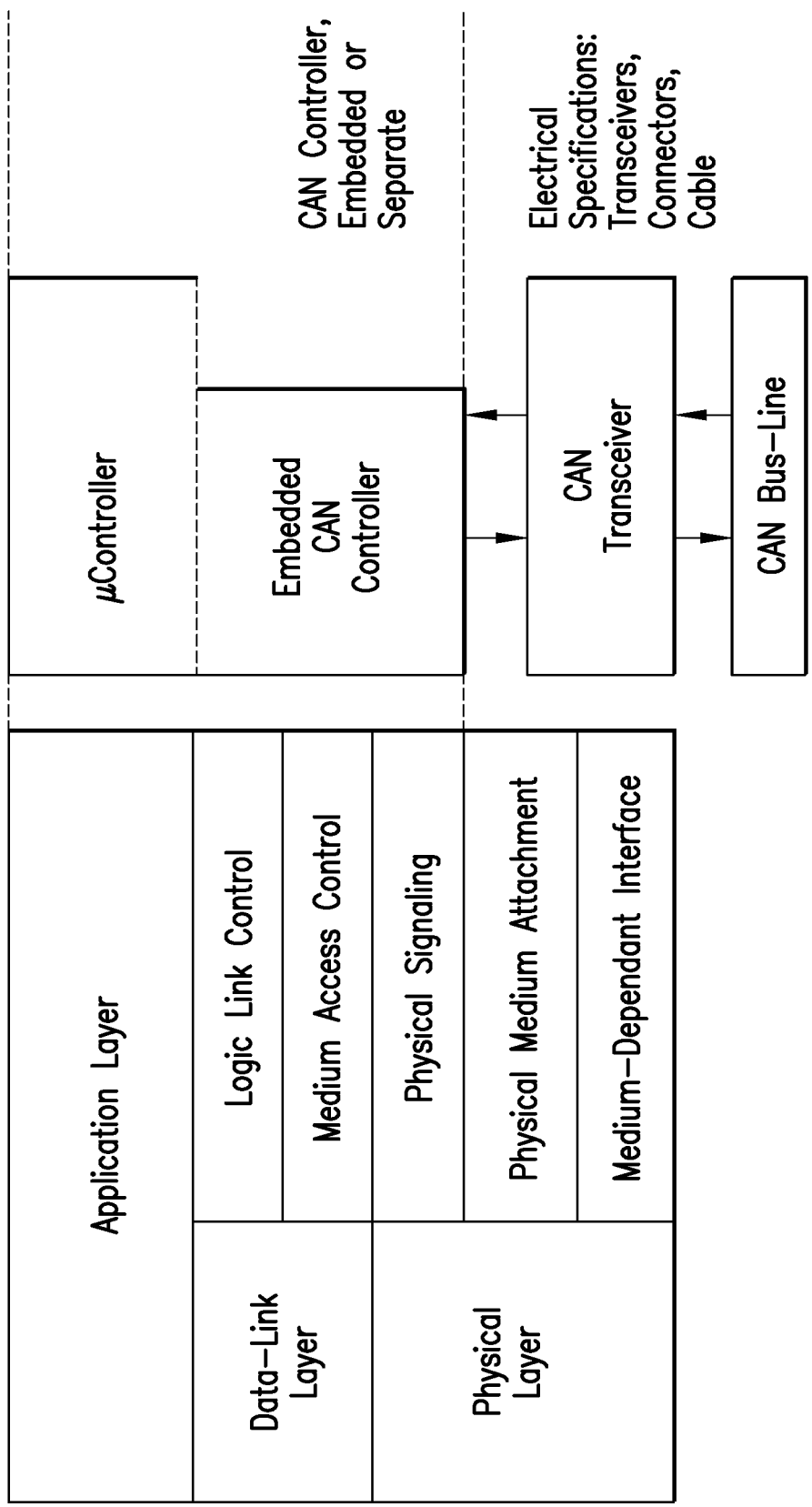
FIG. 3 is a diagram of the layered ISO 11898 standard architecture for an ECU.

As a broadcast network, the ECUs in a CAN are laid out in an arrangement following the ISO 11898-2 standard (also called high speed CAN), the most commonly used architecture in automotive and industrial applications. High speed CAN connects all ECUs on a linear, two-line (twisted pair) bus terminating on either end with 120Ω resistors connecting the two lines. The two lines have a base, recessive voltage of +2.5V with the CAN high line increasing to +3.5V and the CAN low line decreasing to +1.5V for dominant bits. As illustrated n FIG. 3, the ECUs conform to the Open Systems Interconnection (OSI) model that characterizes and standardizes the communications functions of a telecommunication or computing system.

Figure 4:
FIG. 4 is a diagram of a data frame which is the most common type of CAN message.

There are four types of CAN messages: data frames, remote frames, error frames, and overload frames. Data frames, as shown in FIG. 4, are the most common type of CAN message. Data frames consist of one dominant 0 bit denoting the start of frame, followed by an 11-bit arbitration field or message identifier (ID). The next three bits are used for protocol purposes. The following four bits comprise the Data Length Code (DLC), which signifies the length of the data field in bytes. The eight-byte data field follows the DLC, and is succeeded by a fifteen bit Cyclic Redundancy Check (CRC) and a one-bit delimiter. The message ends with nine bits that are used to acknowledge the reception of the message and mark the end of the message. Seven bits of interframe space follows before the next message is sent. Remote frames are simply data frames with an empty data field, and are sent to request data. Error frames are sent to signify that an error was detected on the CAN bus. Overload frames are sent when an ECU cannot process messages fast enough, and requests for the last message to be repeated. Improvements in ECU technology have eliminated the need for overload frames.

Second, we consider attackers that utilize an ECU to inject messages into the CAN bus. These attackers can perform Denial of Service (DoS), brute force, replay, and bit injection attacks, and must act within the CAN protocol. DoS attacks consist of repeatedly sending error frames, data frames, remote frames, or overload frames to disrupt or delay bus traffic. Brute force attacks involve attempting to create a MAC collision in order to generate a valid MAC. Replay attacks involve the attacker replaying a previously valid MAC paired with a malicious message, or replaying a valid message-MAC pair that causes damage to the system in some way.

The authentication mechanism that can be implemented in existing intra-vehicle CANs will now be described. The mechanism includes adding a hardware-based security module onto the CAN bus, updating software on the existing ECUs in the intra-vehicle networks, a compression method to reduce the message size, applying truncated SHA-3 (Secure Hash Algorithm-3 based on the Kaccak cryptographic function family) for MAC, and a synchronization method to distribute Huffman trees to the corresponding ECUs.

The main reason most of the attacks discussed above can be successful lies in the fact that the CAN lacks message authentication. When adding a message authentication mechanism to the existing CAN, we aim to achieve the following design goals:

Compatibility: The authentication mechanism should be compatible with the existing CAN protocol. It should not require any changes to the CAN protocol, which has been widely adopted and is difficult to modify for deployed vehicles.

Easy deployment and maintenance: It should have low deployment overhead and low maintenance overhead. It should not require any hardware changes or replacements of the existing ECUs in the intra-vehicle networks. It is preferable that the ECUs only incur software updates, and that these software updates should also be efficient.

Fast/Real-time: The authentication mechanism should not introduce non-tolerable delay that affects the normal operation of the car. That is, it should be fast and real-time, with minimum latency.

Low cost: The overall cost to implement the entire authentication mechanism should be low, in terms of hardware and software cost as well as labor.

Low key management overhead: The key distribution in the initialization phase should be efficient. The key management overhead should be low when ECUs are added onto or removed from the CAN bus.

To achieve the above design goals and defend against the attacks discussed above, the invention provides an in-car security module, named the Security ECU (SECU). The SECU will act as an authentication module to verify CAN messages, detect/block malicious messages, and facilitate key distribution. The SECU of the invention is intended to be inserted into the OBD-II (On-Board Diagnostics) port for convenience of installation, thus making the invention backwards compatible with earlier vehicles. The OBD port is connected to the CAN bus. If an attacker has gained physical access to the vehicle, they are able to modify the vehicle however they choose, which software is unable to prevent. Thus, these types of attacks were not investigated. To mitigate the effects of an attacker gaining physical access, the SECU can be easily installed in a less accessible location within the car since it only requires a power supply and connection to the CAN bus.

The invention provides the following features: The SECU will share a unique key and a counter with each ECU on the CAN bus. When a legitimate ECU sends a message, it will first compress the message and then generate a MAC of the counter and the secret key. The counter will be increased by one for each transmitted message. The ECU then fits the compressed message and the MAC into one CAN frame, and sends it onto the CAN bus. The SECU will perform the message verification on behalf of the intended receiver(s) of the message. If the verification passes, the receiver(s) simply decompress the message and use it as a normal CAN message. If the verification fails, the SECU will corrupt the CAN frame before it is fully received by the intended receiver(s). The corrupted CAN frame will be ignored by the intended receiver(s) as if it was never received. Therefore, a malicious message generated by the attacker will inflict no damage on the system.

In order to realize the invention, it was necessary to address the following technical issues: key distribution and management, message compression, and quick malicious message detection and corruption. The invention provides solutions to these issues as described herein below.

With the system of the invention setting and authentication design, an ECU only requires key sharing with the SECU, and not with other ECUs. This design significantly simplifies key distribution and management. Existing solutions require key sharing between the sending and receiving ECUs, which produces more overhead on key distribution and management. In the initialization phase, the SECU can generate unique keys and distribute them to each ECU in the CAN. It is assumed this phase is secure, which can be ensured by a technician in a mechanic shop or car dealership. When a legitimate new ECU is added to the CAN, it only needs to obtain the necessary secret key(s) from the SECU.

The key challenge of adding a MAC to a CAN message is that it should only introduce a short delay without measurably affecting the operation of the car. If the CAN message and MAC can fit in one CAN frame, the goal is achieved. Since the CAN frame has only eight bytes, we need to use a short MAC, but at the same time, provide enough security strength.

First, it was necessary to explore the feasibility of fitting the message and its MAC in one CAN frame. To do this, real CAN bus data was collected from various cars and entropy analysis conducted on the data. It was found that the Shannon entropy of the CAN bus messages is around twelve bits, which demonstrates that the transmission data has low entropy and thus is capable of compression.

Immediately after the SECU is added to the CAN, it collects extensive CAN data during vehicle operation. This data is used to build the Huffman trees and will ensure that initial latency is at a minimum when the system starts functioning. Once sufficient data is collected, the SECU updates all ECUs in the CAN to communicate using the protocol of this invention, as represented by FIG. 5. Unique secret keys randomly generated by the SECU are assigned to each message ID, and are known to only the SECU and the ECUs that send messages of that message ID. Key distribution and Huffman tree generation should be completed in a secure area such as the manufacturer's test site, since they could be points of attack.

The update will provide ECUs with MAC generation capabilities, and will create counters for each message ID. Every time an ECU sends a message, it increments the counter associated with the ID of that message. The SECU does the same when it receives the message. Each ECU stores only the secret keys and counters corresponding to the message IDs that it sends. Since the SECU verifies incoming messages, ECUs do not need to store secret keys and counters corresponding to message IDs that they receive. The SECU stores a look-up table with a list of message IDs as the keys and each corresponding secret key and counter as values.

To generate a MAC, an ECU hashes the relevant secret key and counter together. The counter is necessary to prevent replay attacks. The ECUs and the SECU precompute hashes for future counter values that are stored in lookup tables to save time when they send a message. This is possible because the only way for attackers to record and reuse MACs is easily detectable to the SECU, allowing it to interrupt malicious messages and invalidate the stolen MAC.

A simple lookup table method requires more storage space than is practical for use in ECUs. Several different compression algorithms were tested, the sizes of compressed messages and the sizes of the compression dictionaries were recorded, and it was found that Huffman coding was the optimal choice. The Huffman trees were generated from CAN data logs using bytes as symbols, and each CAN message was encoded separately. A Huffman tree was generated for each unique message ID, so each ECU would only have to store the Huffman trees for the message IDs that it communicates with.

From pattern analysis, it was found that there were many cases where messages of the same ID varied only slightly over time. Videos have similar temporal redundancy, which the MPEG compression algorithm utilizes through interframe compression, where some frames consist of the difference from a reference frame prior to the current frame. Our implementation of interframe compression also utilizes temporal redundancy, sending the change in each byte from message to message.

After data collection has finished, interframe compression is applied on the messages within each unique message ID, and Huffman encoding is performed on the result. To avoid potential errors, all 256 possible bytes are encoded into each Huffman tree, including those with a frequency of zero. For efficiency, a maximum compressed message length, N=64−(MAC+SL) bits, is imposed. All messages with compressed versions longer than this length will not be compressed. SL signifies the stuffing length and is three bits long; this is the number of zero bits that were stuffed in front of the encoded message during compression to make the final data field a whole number of bytes (i.e., if the encoded message is E bits long, then SL=8−(E mod 8) in binary, a value from 000 to 111). The bit stuffing is necessary due to the CAN protocol mandating that a whole number of bytes be sent in the data field, which is not necessarily the case for bit strings returned by compression algorithms.

Compressed messages will consist of one CAN message of the format MAC+SL+encoded message. The previous message will be stored for each unique message ID to allow for the change values to be processed. Each of the eight bytes of the stored message is considered independently. If there is no previous stored byte for that byte of the message, the current byte is taken to be the actual byte value, not the changed value. This procedure takes care of the fact that message lengths vary even within the same message ID. Uncompressed messages, whose compressed counterparts are longer than the maximum compressed length, will consist of two CAN messages: the first with the first three bytes of the uncompressed message, and the second with the three byte long MAC plus the remaining (up to) five bytes of the uncompressed message. For both types of messages, the MAC is placed before the message in order to give the SECU more time to authenticate the message and destroy it if it is invalid. Refer to FIG. 5 for a diagram of message formats.

The MAC for compressed messages will comprise only the SHA-3 hash of the message ID's counter and secret key. The MAC for uncompressed messages will consist of the SHA-3 hash of the first three bytes of the uncompressed message along with the message ID's counter and secret key.

ECUs will be able to identify an uncompressed message from the DLC in the control bits of a CAN message. If the length of the data field is equal to that of a MAC (i.e., three bytes), then that message contains the first three bytes of the uncompressed message, and the next message of that message ID will contain the MAC plus the remaining (up to) five bytes of the uncompressed message. This uncompressed message represents the actual data values, as opposed to the change in values for compressed messages. The MAC is generated by hashing the first three bytes of the uncompressed message in addition to the secret key and counter to prevent spoofing of the uncompressed message, since the first three bytes are sent in a separate CAN message. The remaining (up to) five bytes of the uncompressed message are protected from spoofing by being in the same message as the MAC itself. The uncompressed message protocol is structured as described in FIG. 5 in order to allow for the SECU to have enough time to verify and destroy malicious messages.

To reduce the processing power and memory strain on normal ECUs, data collection and Huffman tree generation are performed on the SECU. Thus, for a short duration after installing the SECU, the vehicle will continue to use the unmodified CAN protocol while the SECU performs data collection on normal CAN bus traffic. After data collection, interframe compression, and Huffman coding are finished, the Huffman trees are serialized to be sent within CAN messages for distribution to the other ECUs. Huffman trees are full, so they can be serialized by storing preorder traversal of the tree along with a bit identifying each node as a parent node or leaf node. The zero bit will represent a parent node, so when deserializing, the next bit in the data field will be read as a node identifier bit. However, when a one bit representing a leaf node is read during deserialization, the following eight bits will be read as the value of the node in the Huffman tree.

There are at most 256 possible bytes that can exist as leaf nodes in a Huffman tree in the invention protocol. In a full tree, if there exist N leaf nodes, there must be N−1 parent nodes. Thus, $256+255=511$ bits≈64 bytes are required as node identifier bits, so $64+256=320$ bytes are required to serialize the Huffman tree. Since we generate a unique Huffman tree for each message ID, 255 Huffman trees must be sent, and a message ID must be sent for each sync message. (From an analysis of the collected CAN data, it was found that the Subaru, Honda, Toyota, and Lexus had 24, 28, 35, and 78 unique message IDs respectively. Thus, it was reasonable to assume a maximum of 255 unique message IDs, since one ID will be used for sync messages.) This results in $320*255/7≈11700$ messages needed to send every Huffman tree. From message analysis, it was found that for any given message ID, at most approximately 100 messages are sent per second. Therefore, in order to not slow down bus traffic drastically, a rate of 50 sync messages was assumed being sent per second after data collection and encoding are finished. Thus, only $11700/50=234$ seconds≈4 minutes is necessary to finish sending all Huffman trees. It is also important to note that this slowdown is only a one-time occurrence.

Figure 6:
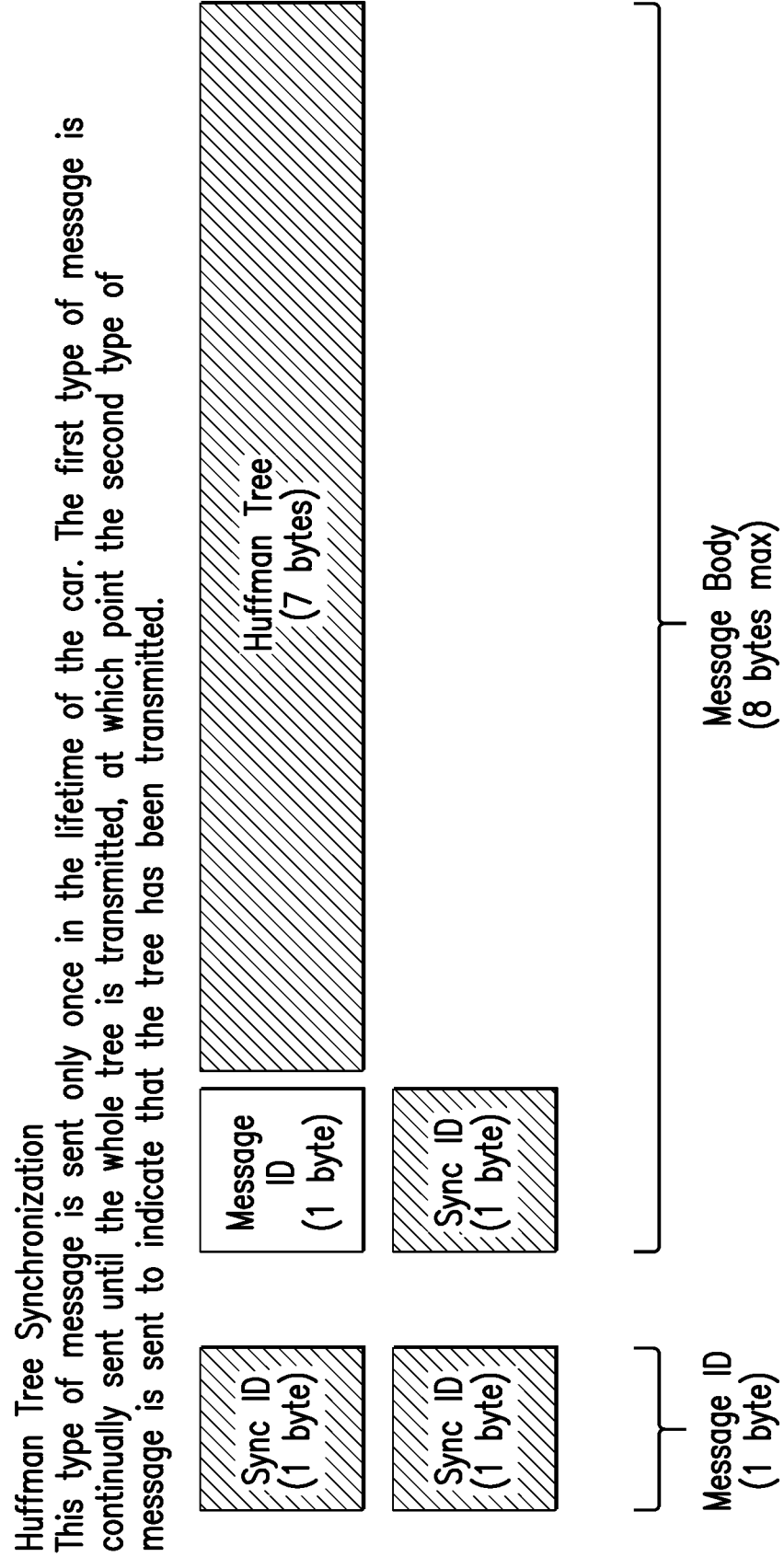
FIG. 6 is a diagram illustrating compressed Huffman tree synchronization messages.

Once Huffman trees are completely distributed, the SECU will send a unique message to signal the completion of Huffman tree distribution and the initiation of compressed message sending. This message contains the sync ID in place of a normal message ID with no data following it. Refer to FIG. 6 for a diagram of sync messages. Using interframe compression, any new message can now be generated with a different permutation of change values. The Huffman trees encode every possible byte value, so all potential change values have a corresponding Huffman code.

Interruption of malicious messages is conducted by the SECU, which sends high voltage through the CAN high line when an invalid MAC is detected. In the CAN protocol, high voltage in the CAN high line represents dominant bits. Since the end-of-frame for all messages must consist solely of recessive bits, writing dominant bits over the recessive bits causes the end-of-frame to be corrupted. The interrupted message is thus treated as a corrupted message and ignored by all ECUs.

The changes to the CAN protocol are minimized to maintain backwards compatibility. Only the message data field is modified and one new type of message used in dictionary synchronization is added, the Huffman tree synchronization message.

To test the invention method for securing the CAN, a model was created. The model was composed of both software programs that were coded to implement the changes that were proposed to the CAN protocol, and a hardware test bed on which we ran the programs and simulated a real CAN.

Most of the message processing code was written in Python for easier prototyping. A commercially available implementation would be written completely in C to make message processing as fast as possible. A Python extension was written in C to compute SHA-3 (Keccak) hashes in the test bed. This implementation differed from the official SHA-3 implementation in that it was modified to increase speed and to generate a hash of the desired length. This SHA-3 implementation is a C implementation, which was used in order to gather statistics about how fast the algorithm would perform in a car equipped with an SECU.

The test bed modeled a standard CAN bus with three ECUs. It incorporated two Raspberry Pi 2 Model B boards and one Raspberry Pi 3 board running the Raspbian operating system, with the Raspberry Pi 3 acting as the SECU and the Raspberry Pi 2s acting as regular ECUs. All three Raspberry Pis utilized a Raspberry Pi to Arduino (Arduberry) shield and an Arduino CAN Shield to communicate using the CAN protocol. The CAN shields were connected by wires in order to simulate a CAN bus. An Arduino script facilitated communication between the Python scripts running on the Raspberry Pi and the hardware on the CAN Shield. This system was used to ease prototyping. A faster implementation could be achieved by using field-programmable gate arrays (FPGAs). Although there are actually 2048 possible message IDs in the CAN protocol, the test bed we are using only supports up to 256, and all our subsequent calculations were done with this limit. However, CAN implementations often have far fewer than even 256 message IDs, as shown in a recent analysis of Mini-Cooper CAN message IDs, which found only fifteen unique message IDs.

It was verified that the ECUs within the test bed could communicate correctly by having one model ECU send captured CAN data over the bus to the other ECU, which wrote the data to the terminal. Normal traffic with model ECUs communicating with each other was demonstrated, and then this test was repeated using the security measures of the invention. Live CAN data was recorded using the OBD-II diagnostic port of a 2011 Toyota Camry and replayed it on the test bed. CAN data was also collected from a 2011 Honda Accord, a 2010 Lexus GS350, a 2015 Subaru Forester, and a 2007 Jeep Liberty.

Message collection was conducted by attaching a Raspberry Pi 2 Model B to each car's OBD-II port using a DB9 to OBD-II adapter. Messages were logged using a script that read messages from the DB9 port into a text file. The most complete data was for the 2011 Toyota Camry, so it was used for the majority of the analysis.

Message collection for the Jeep Liberty, Honda Accord, Toyota Camry, and the Subaru Forrester was conducted during driving on local roads, as well as while the car was parked. Message collection for the Lexus GS350 was conducted while the car was moving at slow speeds (<5 mph), and while it was parked.

Message entropy was calculated using the Shannon entropy definition $$H(x) = \sum_{i=0}^{N-1} p_i \log_2 p_i$$

on the messages collected from the vehicles. The results are shown in Table 1. The average message entropy across all five cars was 11.436 bits, which was sufficiently low that we found the use of compression algorithms viable.

TABLE 1

Entropy Analysis

| Vehicle | Entropy (bits) |
| --- | --- |
| Subaru Forester 2015 | 12.564 |
| Toyota Camry 2011 | 12.792 |
| Honda Accord 2011 | 12.217 |
| Lexus GS350 2010 | 8.498 |
| Jeep Liberty 2007 | 11.111 |

Figure 9:
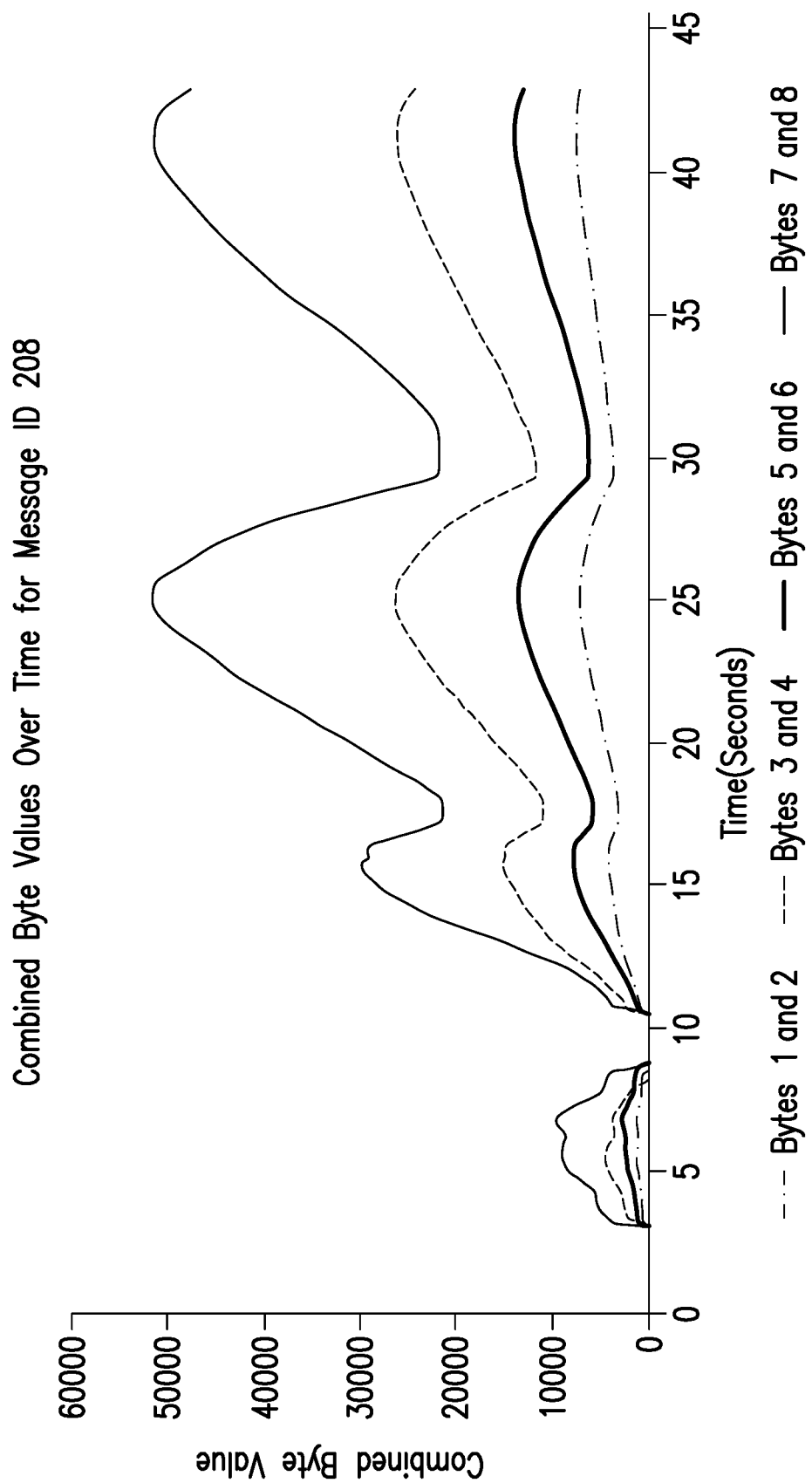
FIG. 9 is a graph of combined byte values of a message that forms a gradually changing interframe-compressible pattern.

In Table 2, it appears that as the number of rounds per hash and the number of packets increases, the time required per round decreases. This is not true. The total time values in the tables include the constant startup time required in addition to the actual time taken to produce the hashes, which has a linear relationship with the number of rounds and MACs generated. This is demonstrated to be true in FIG. 9, which is a plot of the hash time in seconds with respect to the number of rounds the hash performed. As the number of rounds and packets increases, the time per round approaches the actual value of time taken for each round, roughly 2.7 μs per round.

TABLE 2

MAC Generation Summary Data Table

| Data Type (Rounds) | Number of Packets | Average Hash Time (s) | Time Per Packet (μs) | Time Per Round (μs) |
| --- | --- | --- | --- | --- |
| Captured Data (13) | 53,920 | 1.957 | 36.29 | 2.792 |
| Captured Data (24) | 53,920 | 3.526 | 65.39 | 2.725 |
| Randomly Generated (13) | 1,000,000 | 35.695 | 35.695 | 2.746 |
| Randomly Generated (24) | 1,000,000 | 64.896 | 64.896 | 2.704 |

Figure 7:
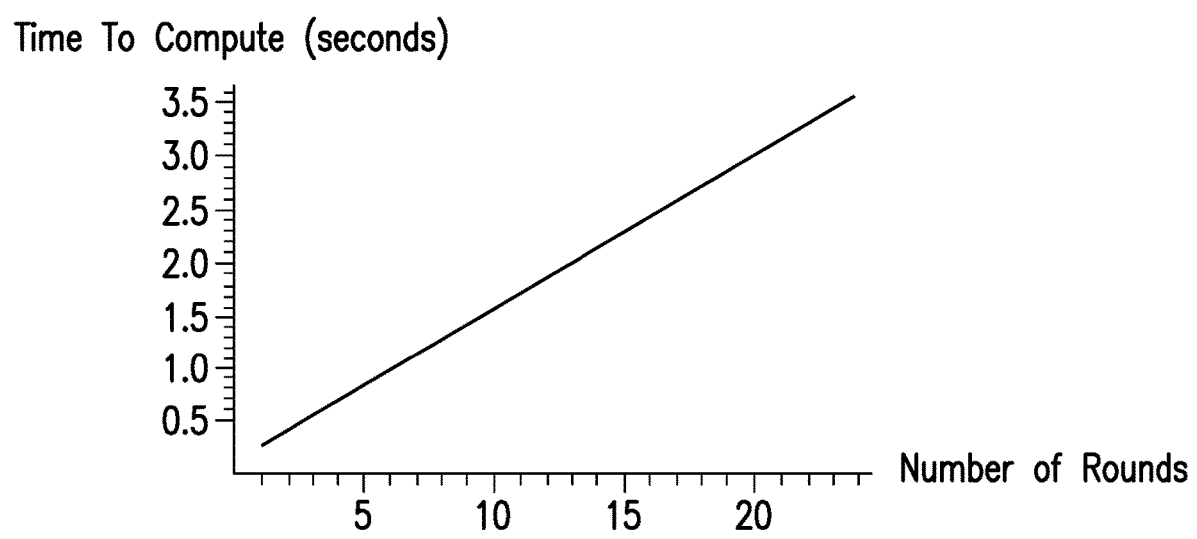
FIG. 7 is a graph of the time to compute all MACs for the real CAN data.
Figure 8:
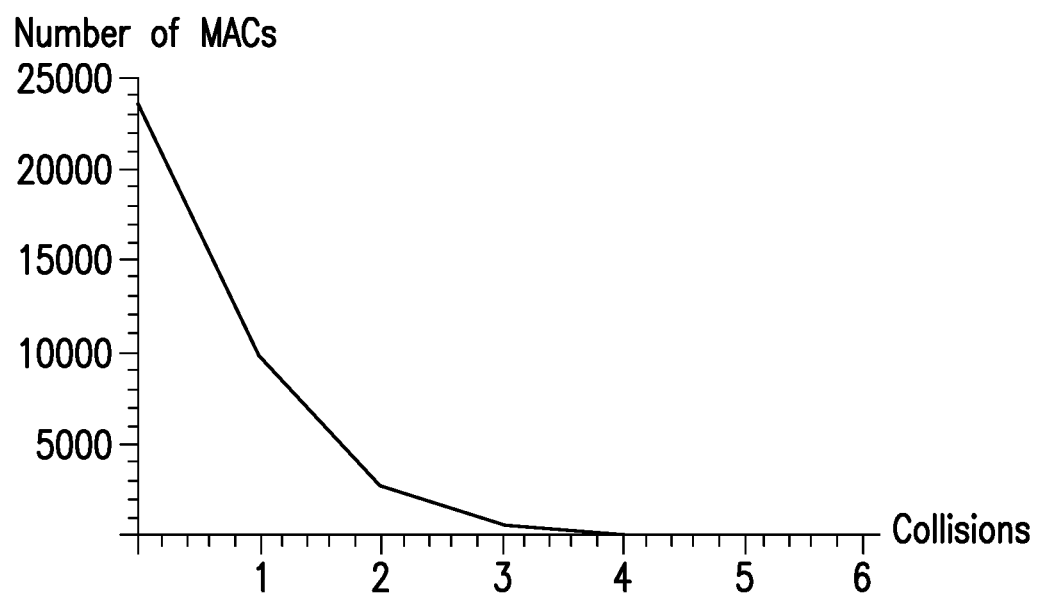
FIG. 8 is a graph of the number of collisions for MACs generated from real CAN data.

A MAC collision occurs when the same MAC is generated from the secret keys and counters of two distinct messages. MAC collision testing was performed to ensure that MAC collisions did not appear too frequently. When MAC collisions occur too often, malicious users can attempt to reverse the hash or perform replay attacks. Replay attacks are sufficiently mitigated by the CAN protocol. Reverse engineering of the hash to find secret keys and counters is largely prevented by the implementation of the invention as well as the nature of Keccak, since each message ID has its own secret key and counter, which increases the difficulty of reversing the hash, and because it is extremely difficult to determine the data that was hashed from the hash itself, even if there are many collisions. FIGS. 7 and 8 show that for randomly generated data there tends to be a normal distribution as expected, but real, captured data is skewed right, having a large amount of MACs with few collisions. To calculate the times in the tables below, we used the "time" command in the Linux terminal taking the sum of user and system time as the time the program used to run since that is better for benchmarking. This is because the real time field shows the actual elapsed time and not solely the time spent on the program, which would be the sum of user and system time.

Various compression algorithms were tested (Table 3) and parameters within those algorithms (Table 4) to find the most promising method. The algorithms were all able to perform in a reasonable amount of time, with the exception of arithmetic encoding. Of all of the different compression methods tested, a combination of Huffman and interframe compression had both the smallest average message size and required storage space. 92.915% of sample data was compressed to within four bytes and five bits, which is the limit for compressed message size in the protocol implemented by the invention. Larger messages were left uncompressed and had to be sent as two messages. Even taking this into account, the average message size was only 1.830 bytes.

TABLE 3

Compression Method Comparison

| Method | Size (Bytes) | Storage (Bytes) |
| --- | --- | --- |
| Uncompressed | 6,482 | 0 |
| Lookup Table | 3 | 6654502 |
| Arithmetic | 4.003 | 2424 |
| Shannonbon-Fano | 6.452 | 12384 |
| Huffman | 3.733 | 84520 |
| Huffman + Time | 1.830 | 79912 |

TABLE 4

Huffman Implementation

| Type | Avg. Size (bits) |
| --- | --- |
| Body as Symbol - Single Tree | 44.182 |
| Body as Symbol - Individual Trees | 52.565 |
| Byte as Symbol - Single Tree | 29.860 |
| Byte as Symbol - Individual Trees | 24.963 |

From the entropy analysis, it was found that for some message IDs the contents of the messages were almost always identical. Thus, separate compression dictionaries were created for each ID. When examining message bodies, it was found that values would increase or decrease by small amounts (see FIG. 9), which can be efficiently compressed using interframe compression. Compression allows most messages to be the same length or shorter even with the three byte MAC; however, there are some messages that must be split up into two in order to send the MAC with the message.

The goal of the MAC generation script is to minimize the time it takes to generate the MAC while maximizing the security of the MAC. For the implementation of the invention, the minimum size of the data field is four bytes. Thus, the shortest possible message that could be sent along the CAN containing a MAC would be seventy-six bits long, and assuming a high speed CAN bus with a baud rate of 1 Mb/s, that would mean that it would take at least seventy-six microseconds to send each message. The data collected on the MAC generation script in Table 1 shows that it would take approximately 36.29 µs on average to complete 13 rounds of the SHA-3 hashing function and produce a MAC. Since 36.29 µs is significantly less than 76 µs, the hashing function can generate MACs faster than messages can be sent. This means that all MACs can be precomputed before they are required, resulting in minimal latency due to MAC generation.

10,000 iterations of the Huffman encoding and decoding algorithms were run, rewritten in C for speed, on the data collected from various vehicles. It was found that the Huffman encoding takes 2.92 µs, while the decoding process takes 2.08 µs. The reason the encoding algorithm takes longer than the decoding algorithm can be explained by the fact that messages that cannot be compressed are still run through the encoding algorithm, while the decoding algorithm only decompresses messages that are proven to fit within four bytes when compressed. Assuming the worst case of an uncompressed message, adding together the speed of our MAC generation (36.29 µs), our encoding algorithm (2.92 µs) of the invention, the total processing time is 39.21 µs. Since the message is not compressed, no decoding is necessary. However, encoding is still necessary to verify that the message cannot be compressed. For compressed messages, the MAC can be precomputed and the total processing time is 5.00 µs.

The solution of the present invention is faster than other proposed solutions, such as VeCure, whose total processing time is ~50 µs. VeCure itself functions faster than a majority of existing solutions.

Figure 10:
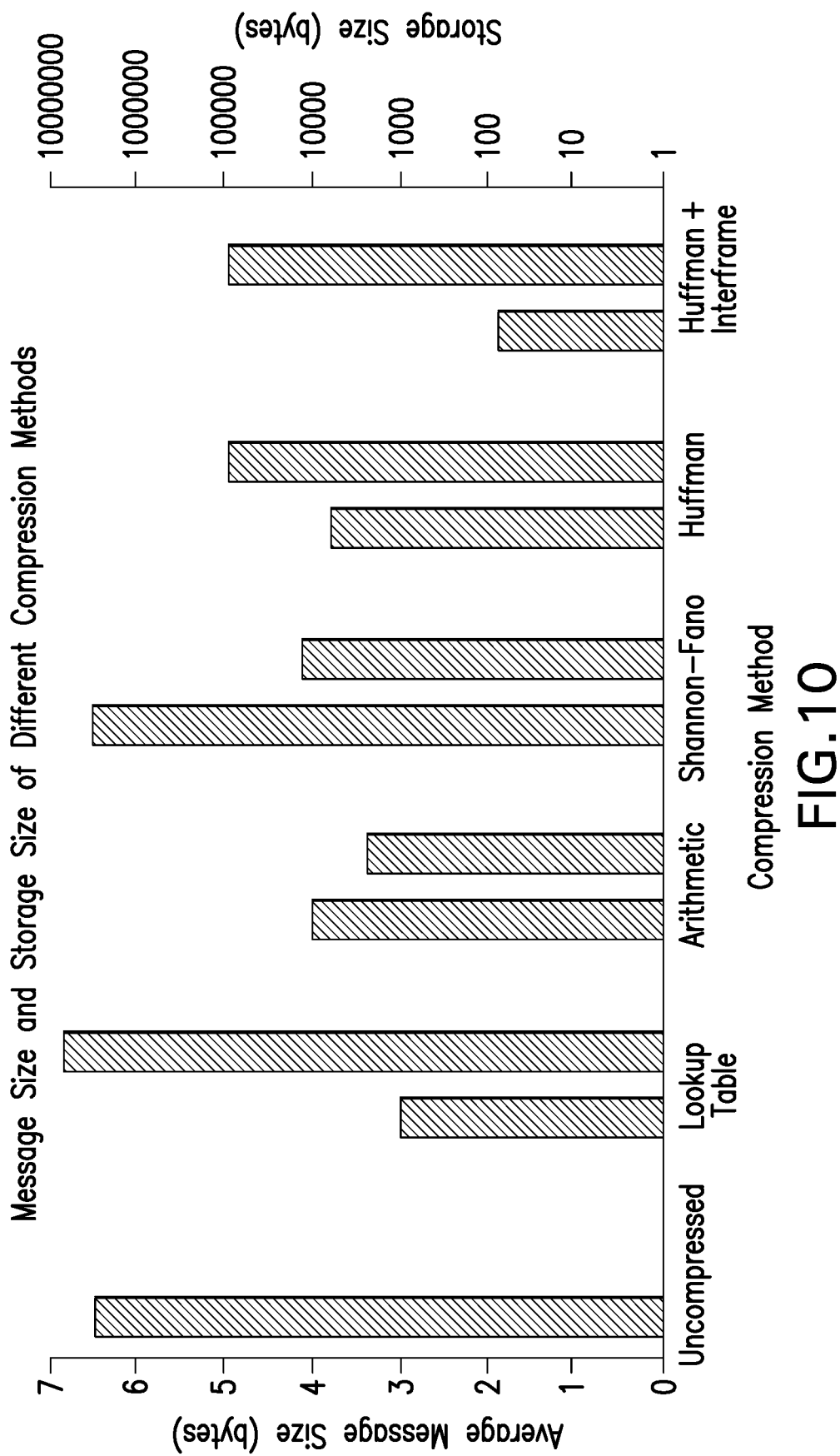
FIG. 10 is a bar graph of storage space usage of different compression algorithms.

As shown in FIG. 10, the average compressed message size for messages compressed using Huffman coding and interframe compression is drastically lower than the average compressed message size for any other compression algorithm tested. It also requires less than a tenth of the storage space needed for the original lookup table method. Lempel-Ziv compression, which is based on run-length encoding, does not compress CAN messages well since CAN messages are so short. Arithmetic coding functions similarly to Huffman, but encodes and decodes much slower when compared to Huffman coding. Shannon-Fano compression performed quite well, but it was still less efficient that Huffman. Since every other compression algorithm resulted in higher message sizes without a substantial benefit in storage space saved, we found that Huffman coding and interframe compression was the best compression algorithm for use in our protocol.

It was determined that a three byte long MAC is sufficiently secure against brute-force attacks in an automotive environment. An average entire CAN message implementing the security solution of the present invention is roughly 96 bits long. Assuming a bit rate of 500 kilobits per second, the most common bit rate for automotive applications, that eleven consecutive recessive bits occur at the end of every message (they may be even less common), and that the attacker is able to send messages at every possible opportunity within the CAN protocol, this means that they are able to make thirty-two attempts every (128+32)*96/500,000=0.031 seconds. For a three byte long MAC, there are $2^{24}$ possibilities, so an average of $2^{23}$ attempts is necessary to brute force the MAC. Therefore, it takes approximately $2^{23}/32*0.031=8053.064$ seconds~2.237 hours on average to brute force a MAC in the system according to the invention. An attacker will not have this much time, since the MAC changes every time a message with the same ID is sent, due to the counter value incrementing. Replay attacks are prevented by the same incrementing counter.

Based on the compression dictionary specifications, the hardware requirements for the SECU can be estimated. The maximum number of message IDs observed in a car is forty, and the worst case for each Huffman tree results in a tree with 511 nodes. Since each node requires approximately nine bytes on a 32-bit system (one byte for the data, four bytes for each pointer), the SECU will need at least 9×40× 511=183,960 bytes of storage space. The SECU also needs to store secret keys, but forty 8-byte-long secret keys comprises only 320 bytes, which is small compared to the storage space needed for the compression dictionaries. Processing capabilities must be at least that of a Raspberry Pi 2 Model B, because the results were generated on that device, and devices of lower processing power may not perform well enough to allow proper implementation of our protocol.

MACs could be generated without hashing their associated messages because the ability of attackers to record and replay MACs is severely limited by the CAN bus and our protocol. Counters increment every time a message with a specific ID is sent, so an attacker must simultaneously record a legitimate MAC and destroy that message to prevent this. However, if the SECU detects a corrupted message, it will send a top priority message for all IDs causing all ECUs to increment their counters, preventing this attack entirely.

This solution may appear to have a single point of failure, but this is not the case. The security features would no longer work, but the driver could still drive the car. A true single point of failure would cause the entire system to fail if the point of failure could not function. Because of this, the system according to the invention is superior to other centralized security systems for the in-car network. Where other systems have a true single point of failure, our system, if rendered nonfunctional, will not inhibit CAN bus traffic, though that traffic will not be secure.

Attacks made using a compromised ECU are considered to inject messages into the CAN bus. An inside attacker, one that gains complete control over the compromised ECU, will be able to obtain all secret keys and counters that are stored on the ECU. However, since the most easily compromised ECUs generally deal with entertainment and non-essential systems, the message IDs that correspond with the compromised keys and counters will generally not be of value to malicious users that want to gain control of critical systems.

Message injection through an ECU would require a valid MAC. Reversing the hash is extremely difficult, due to the security of the SHA-3 (Keccak) hashing algorithm. However, since the MACs are relatively short, an attacker could potentially conduct a brute-force attack to cause a MAC collision. The CAN protocol limits the effectiveness of such an attack. The Transmit Error Counter is a counter implemented on the firmware level that increments by eight on an ECU whenever a message that is transmitted by that ECU receives an error frame. Invalid MACs will cause the SECU to send error frames. Once the counter exceeds 255, after only thirty-two messages, the ECU is turned to the Bus Off state, disallowing it from further CAN bus communication until after 128 occurrences of 11 consecutive "recessive" bits (approximately 128 messages) occur on the bus.

The CAN protocol can prevent in-protocol DoS attacks. Attackers cannot conduct an in-protocol DoS attack using remote frames, since data frames are dominant to remote frames. Overload frames cannot be used to continually delay messages, as the CAN protocol limits ECUs to a maximum of two overload frames. The Transmit Error Counter prevents DoS attacks using data and error frames in the same way that it prevents brute-force attacks.

Bit injection attacks are also prevented by the CAN protocol. This attack requires the corresponding CRC to be bit injected to properly match the transformed message. The CAN protocol prevents this attack because transmitting nodes monitor the bus to make sure the message on the bus is the same message that they are transmitting. During a bit injection attack, the transmitting ECU would detect a bit error and throw an error flag.

Figure 11:
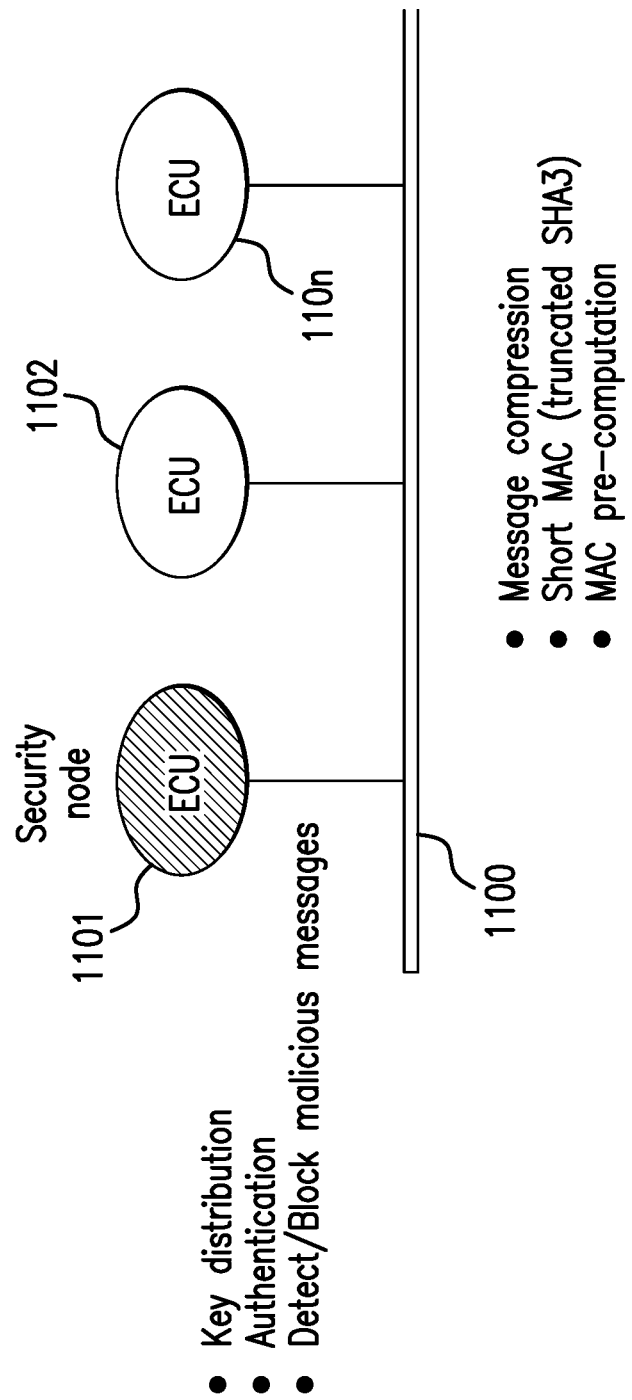
FIG. 11 is a schematic representation of an SECU according to the invention attached to a CAN.

FIG. 11 schematically illustrates a security node (i.e., an SECU) 1101 according to the invention attached to a CAN bus 1100 along with several ECUs 1102 to 110n. The SECU 1101 performs key distribution, message authentication and detects and blocks malicious messages. Malicious messages are corrupted by the SECU before they reach intended receiver(s) (i.e., ECUs). ECUs 1102 to 110n perform message compression, generate a shortened MAC using truncated SHA-3 encryption, and perform MAC pre-computation.

Figure 12:
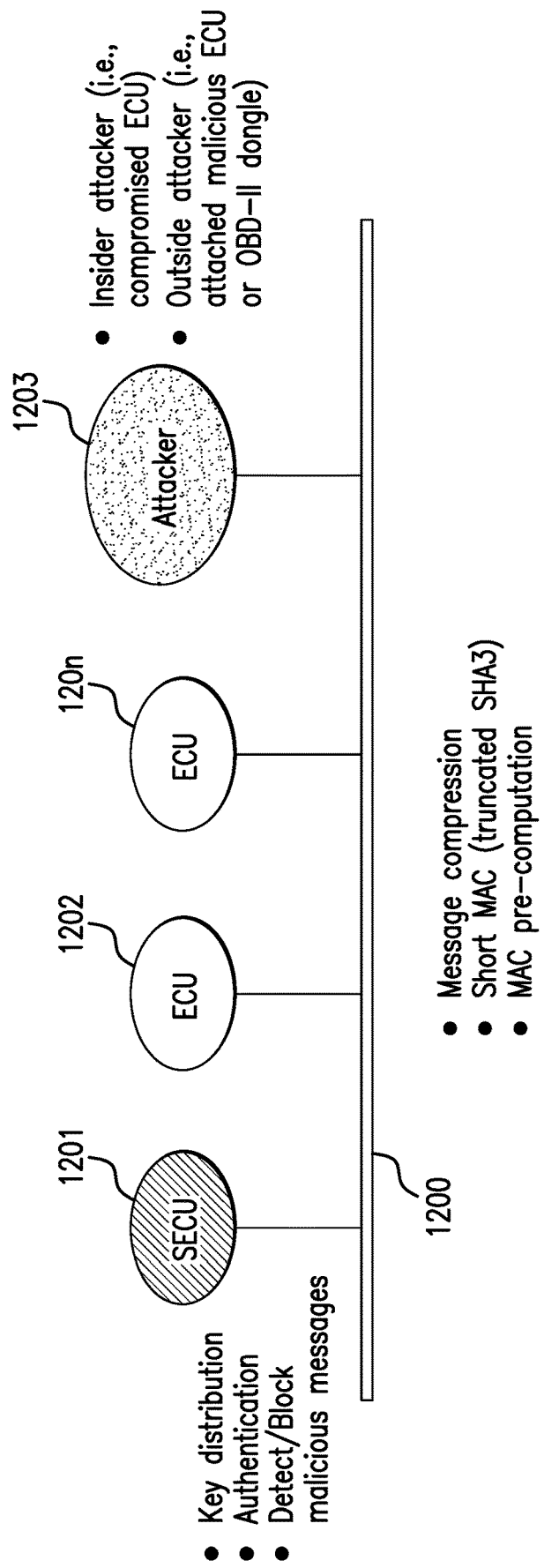
FIG. 12 is a schematic representation of an SECU according to the invention attached to a CAN to which, in a more general case, an attacker may be either an inside attacker or an outside attacker.

FIG. 12 illustrates a general case where an attacker can be either an inside attacker, such as a malicious ECU, or an outside attacker, such as a malicious ECU or an OBD-II dongle. The SECU 1201 is attached to a CAN bus 1200 along with ECUs 1202 to 120n. As before, the SECU 1201 performs key distribution, message authentication and detects and blocks malicious messages, and ECUs 1202 to 120n perform message compression, generate a shortened MAC using truncated SHA-3 encryption, and perform MAC pre-computation. FIG. 12 shows an attacker 1203 attached to the CAN bus 1200. This attacker could be an inside attacker (i.e., a compromised ECU) or an outside attacker (i.e., an attached ECU or an OBD-II dongle). In either case, malicious messages from the attacker 1203 are corrupted by the SECU 1201 before they reach intended receiver(s) (i.e., ECUs). Once corrupted, the messages will be ignored by the ECUs so that no damage is inflicted on the system by the attacker.

Figure 13:
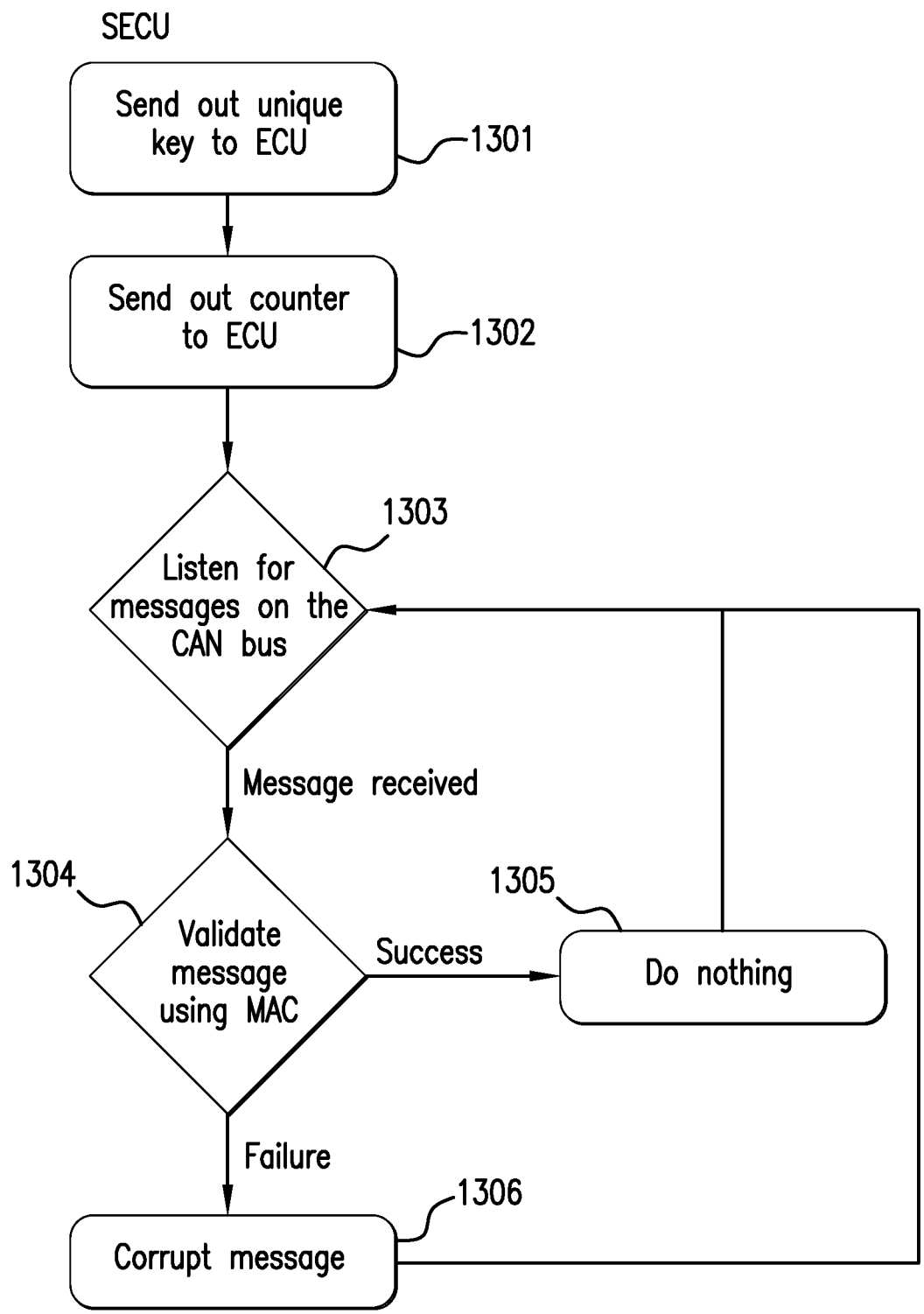
FIG. 13 is a flow diagram showing the logic of the firmware implemented in an ECU to act as an SECU for the CAN.

FIG. 13 is a flow diagram illustrating the logic of the firmware implemented by the SECU according to the invention. The process begins at function block 1301 where the SECU distributes a unique key to the ECUs on the CAN bus. This is followed in function block 1302 by the SECU distributing a counter value to the ECUs on the CAN bus. A test is made in decision block 1303 to listen for messages on the CAN bus. This process is a continuing process, and when a message on the CAN bus is received, a further test is made in decision block 1304 to validate the received message using the MAC in the message. If the validation is successful, the SECU does nothing and allows the message to go to the intended receiver(s) in function block 1305 before the process returns to decision block 1303. If, on the other hand, the validation fails, the SECU corrupts the message in function block 1306 before the process returns to decision block 1303. By corrupting the message, the intended receiver(s) will ignore the message and an attacker will be unsuccessful in inflicting damage to the system.

Figure 14:
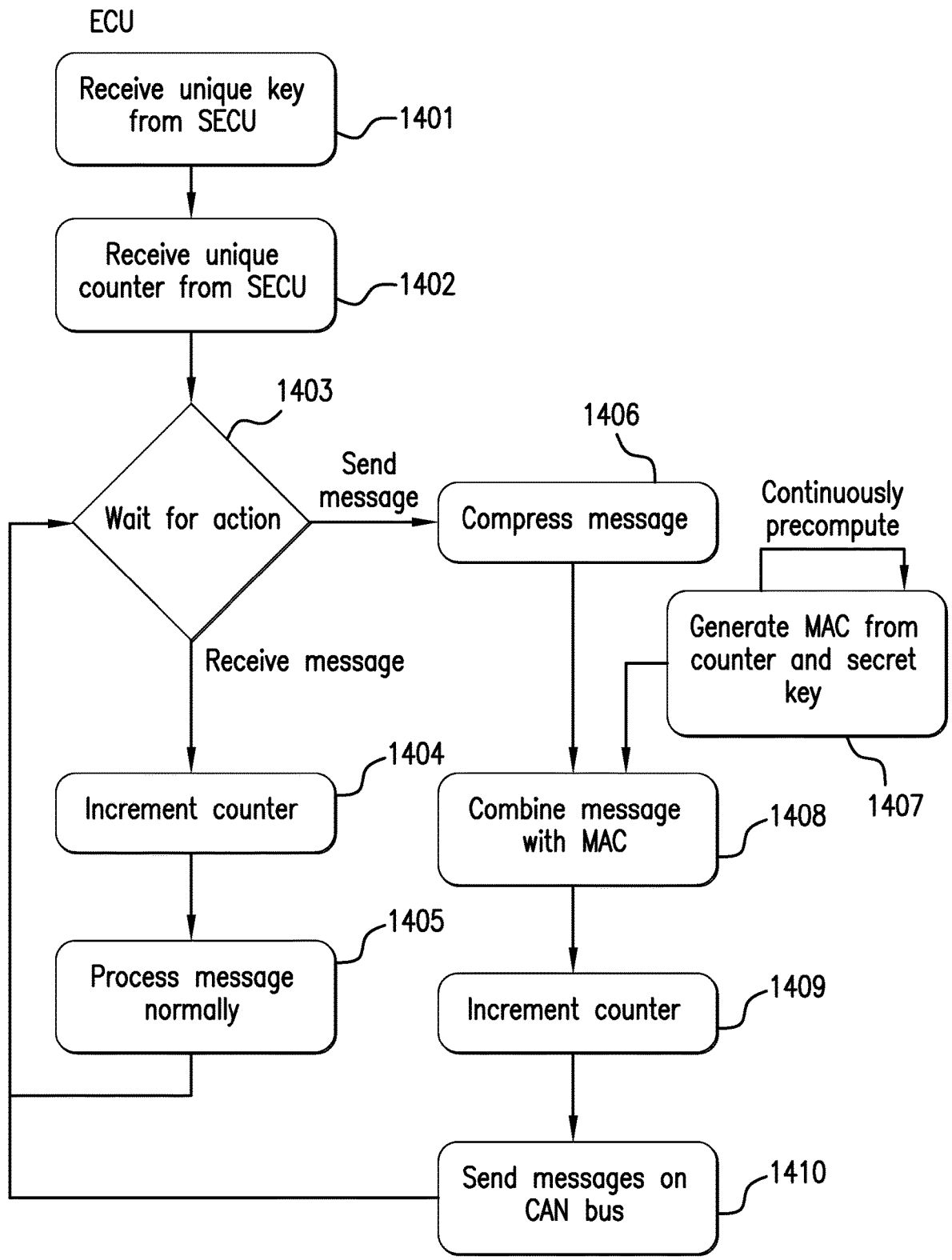
FIG. 14 is a flow diagram showing the logic of the firmware added to each ECU in a CAN according to the invention.

FIG. 14 is a flow diagram illustrating the logic of the firmware of each of the ECUs connected to the CAN bus. The process begins at function block 1401 by receiving the unique key from the SECU. This if followed in function block 1402 by receiving the counter from the SECU. Next, in decision block 1403, the ECU waits for some action. The action may be to send a message on the CAN bus or to receive a message from the CAN bus. In the case of receiving a message, the ECU increments the counter in function block 1404 and the processes the received message normally in function block 1405 before the process returns to decision block 1403. In the case the action is to send a message, the ECU first compresses the message in function block 1406. The ECU continuously precompute and generates a MAC from the counter and secret key in function block 1407. In the process of sending a message, the compressed message from the function block 1406 is combined with the current MAC from function block 1407 in function block 1408. The ECU then increments the counter in function block 1409 before sending the message on the CAN bus in function block 1410. The process then returns to decision block 1403 to wait for the next action.

While the invention has been described in terms of a single preferred embodiment, those skilled in the art will recognize that the invention can be practiced with modification within the spirit and scope of the appended claims.

The invention claimed is:

1. A system for securing a Controller Area Network (CAN), comprising:
   a secure hardware module or Security Electronic Control Unit (SECU) to prevent an attacker from sending malicious messages through a CAN bus to take over control of a vehicle, the SECU sharing a secret key and counter with each Electronic Control Unit (ECU) on the CAN bus, the secret key for an ECU being unique to that ECU, the ECUs of the CAN being provided with Message Authentication Code (MAC) generation capabilities and counters for each message ID,
   wherein when a legitimate ECU sends a message, the ECU performs the following steps:
     first compresses the message and then generates a MAC of the counter and the secret key of the legitimate ECU;
     increases the counter by one for each transmitted message; and
     then fits the compressed message and the MAC into one CAN frame and sends it onto the CAN bus;
   wherein the SECU performs the following steps:
     receiving a message and incrementing the counter associated with the ID of the message; and
     message verification on behalf of the intended receiver of the message;
     if the verification passes, the SECU allows the message to pass to the intended receiver on the CAN bus;
   whereby the receiver decompresses the message and uses the message;
     if the verification fails, the SECU corrupts the CAN frame before it is fully received by the intended receiver
   whereby the corrupted CAN frame will be ignored by the intended receiver as if it was never received preventing a malicious message generated by the attacker from inflicting damage on the system.

2. The system for securing a CAN according to claim 1, wherein ECUs generate a MAC by hashing their secret key and counter together, and ECUs and the SECU precompute hashes for a next counter value that is stored in one or more lookup tables.

3. The system for securing a CAN according to claim 2, wherein Huffman trees are generated from CAN data logs and stored in the lookup tables, and each CAN message is encoded separately, a Huffman tree being generated for each message ID, so each ECU only stores the Huffman trees for the message IDs that the message communicates with.

4. The system for securing a CAN according to claim 1, wherein the SECU is connected to the CAN bus via an On-Board Diagnostics (OBD) port.

* * * * *